(12) United States Patent
De-Lamberterie et al.

(10) Patent No.: US 10,958,356 B2
(45) Date of Patent: Mar. 23, 2021

(54) OPTICAL WIRELESS COMMUNICATION SYSTEM FOR A VEHICLE

(71) Applicant: VALEO VISION, Bobigny (FR)

(72) Inventors: Antoine De-Lamberterie, Bobigny (FR); Francois-Xavier Amiel, Bobigny (FR); Samira Mbata, Bobigny (FR); Vincent Dubois, Bobigny (FR); Thomas Canonne, Bobigny (FR); Nicolas Lefaudeux, Bobigny (FR); Guillaume Thin, Bobigny (FR); Van Thai Hoang, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/508,480

(22) Filed: Jul. 11, 2019

(65) Prior Publication Data
US 2020/0021368 A1 Jan. 16, 2020

(30) Foreign Application Priority Data
Jul. 11, 2018 (FR) .................................. 18 56390

(51) Int. Cl.
*H04B 10/70* (2013.01)
*H04W 4/44* (2018.01)
(Continued)

(52) U.S. Cl.
CPC .......... *H04B 10/70* (2013.01); *H04B 10/116* (2013.01); *H04B 10/1143* (2013.01); *H04B 10/85* (2013.01); *H04W 4/44* (2018.02)

(58) Field of Classification Search
CPC .. H04B 10/70; H04B 10/1143; H04B 10/116; H04B 10/85; H04W 4/44
See application file for complete search history.

(56) References Cited

U.S. PATENT DOCUMENTS

2013/0129349 A1* 5/2013 Maxik .................... H05B 45/22
398/34
2015/0372753 A1* 12/2015 Jovicic ............... H04B 10/1141
398/172
(Continued)

FOREIGN PATENT DOCUMENTS

| EP | 3 098 981 A2 | 11/2016 |
| GB | 2499693 | 8/2013 |
| WO | WO 2018/007385 A1 | 1/2018 |

OTHER PUBLICATIONS

French Preliminary Search Report dated May 22, 2019 in French Application 18 56390, filed on Jul. 11, 2018 (with English Translation of Categories of Cited Documents).
(Continued)

*Primary Examiner* — Mina M Shalaby
(74) *Attorney, Agent, or Firm* — Oblon, McClelland, Maier & Neustadt, L.L.P.

(57) ABSTRACT

An optical wireless communication system for a vehicle comprises a photonic device and control electronics configured to control the photonic device. The photonic device comprises a plurality of photonic components arranged in a two-dimensional matrix array, and the control electronics are configured to control individually or in groups the photonic components of the plurality of photonic components. Each photonic component or each group of photonic components is configured, where appropriate conjointly with an optic, so as to emit and/or receive at least one optical wireless communication signal in a propagation direction that is discriminable relatively to a propagation direction of optical wireless communication signals emitted and/or received, respectively, by at least one other photonic component or by at least one other group of photonic components of the plurality of photonic components.

18 Claims, 2 Drawing Sheets

Figure 1:
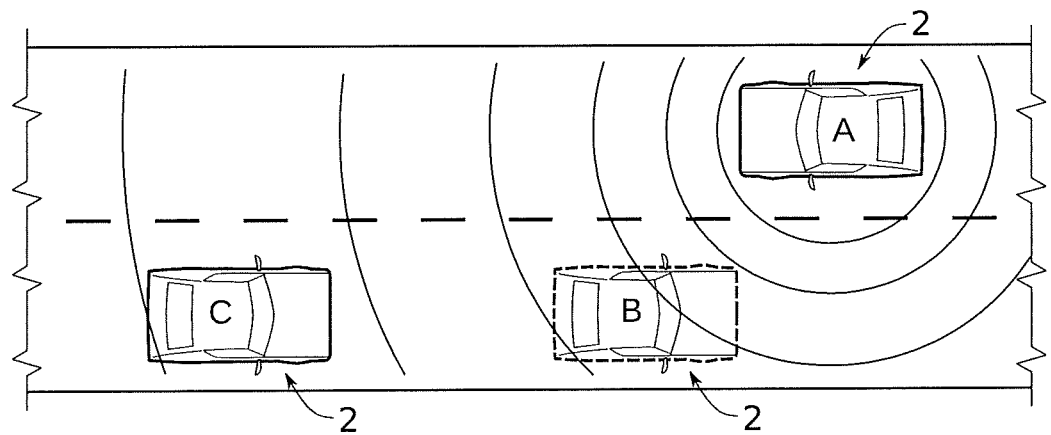

(51) Int. Cl.
*H04B 10/114* (2013.01)
*H04B 10/116* (2013.01)
*H04B 10/85* (2013.01)

(56) References Cited

U.S. PATENT DOCUMENTS

| | | | |
|---|---|---|---|
| 2016/0347238 | A1 | 12/2016 | Hue |
| 2017/0186327 | A1* | 6/2017 | Uysal ................. H04B 10/1125 |
| 2018/0196139 | A1* | 7/2018 | Brown ................. H04B 10/116 |
| 2019/0198709 | A1* | 6/2019 | Wildeson ................ H01L 33/38 |
| 2019/0306396 | A1* | 10/2019 | Kratochvil ........... H04N 5/2254 |

OTHER PUBLICATIONS

Heck, M. "Highly integrated optical phased arrays: photonic integrated circuits for optical beam shaping and beam steering", Nanophotonics, vol. 6, No. 1, 2016, 15 pages.

Mekhiel, C. et al. "LED beam steering for Li-Fi communications", 2016 IEEE 21$^{st}$ International Workshop on Computer Aided Modelling and Design of Communication Links and Networks (CAMAD), 2016, pp. 237-241.

* cited by examiner

OPTICAL WIRELESS COMMUNICATION SYSTEM FOR A VEHICLE

The present invention relates to the emerging field of communications involving motor vehicles. In this field, in which vehicles communicate with one another or with infrastructure, problems related to cyber security, to the integrity of the communicated data and to electromagnetic pollution arise.

Several communication techniques involving motor vehicles are known among which certain implement Wifi™ technology, others implement Bluetooth® technology, and yet others implement optical wireless communication (or OWC) technology. These techniques have in common the emission of communications signals in a spatially extensive, or even omnidirectional, broadcast spectrum. Thus, it is possible for the signals to be received, or even read, by vehicles or infrastructure other than the vehicles or infrastructure to which the signals are addressed. Likewise, it is possible for the vehicles or infrastructure to which the signals are addressed to not be able to discriminate the vehicle having emitted them from among a plurality of vehicles possibly each emitting communication signals. Furthermore, problems with electromagnetic pollution and with bandwidth congestion are also emerging, in particular because of the diffuse nature of the implemented communication technologies.

The present invention more particularly relates to an optical wireless communication system for a vehicle and to a vehicle optic equipped with such a system.

Such a communication system is known that implements a method for communicating between an emitter motor vehicle comprising at least one luminous device and a target. The method essentially comprises a step consisting in automatically modulating a light signal emitted by the luminous device with a view to a communication between the vehicle and the target, the luminous device being chosen from: a lighting device, a daytime running light (DRL) and a position light.

One problem with this type of system stems from the fact that the communication signals of the communication systems may be received, or even read, by vehicles or infrastructure other than the vehicles or infrastructure to which these signals are addressed. It also stems from the fact that, in the prior-art communication systems, vehicles or infrastructure receiving the communication signals are unable to determine the emitter thereof unequivocally. Thus, the communication signals may be read by non-recipient systems or received from an indeterminate emitter, this making current communication systems ineffective and subject to intrusion.

The present invention aims to at least partially remedy the limitations of current techniques.

To this end, a first aspect of the present invention relates to an optical wireless communication system for a vehicle, the system comprising at least one photonic device and control electronics configured to control said at least one photonic device. The communication system is essentially such that said at least one photonic device comprises a plurality of photonic components and that the control electronics are configured to control individually or in groups the photonic components of the plurality of photonic components, each photonic component or each group of photonic components being configured so as to emit and/or receive at least one optical wireless communication signal in a propagation direction that is discriminable relatively to a propagation direction of optical wireless communication signals emitted and/or received, respectively, by at least one other photonic component or by at least one other group of photonic components of the plurality of photonic components.

Thus, the invention makes provision for the direction of propagation of the communication signals to form part of a set of emission characteristics of each photonic group or of a set group of photonic components.

Moreover, the photonic device of the communication system according to the first aspect of the invention may furthermore be configured to illuminate a region located around the vehicle differently depending on the activation of the photonic components, in particular in order to generate low beams (dipped beam) or high beams (full beam) with this single device; this requires at least certain of the photonic components to have an emission directivity relatively different from the others. In contrast, such lighting functions of the photonic device do not however alone require the light signals to be emitted and/or received by a photonic component or a group of photonic components in a propagation direction that is discriminable relatively to a propagation direction of light signals emitted and/or received, respectively, by at least one other photonic component or by at least one other group of photonic components.

By "discriminable" what is meant is the quality of that which may be discriminated, differentiated, distinguished.

By virtue of the system according to the first aspect of the invention, the communication signals may be emitted specifically toward one or more identified targets or received from one or more identified emitters, in order to be received, or even read, only by this/these targets, or in order to make it possible to know, without ambiguity, from which emitter such a message originates, respectively.

Thus, reception of the communication signals by targets other than that or those to which the signals are addressed is made avoidable.

The invention also allows, via the discriminability of (or ability to discriminate) the received signals, vehicles or infrastructure receiving communication signals to be able to determine the emitter thereof unequivocally.

Thus, it is possible to prevent the communication signals from being received, or even read, by non-recipient systems or received from an indeterminate emitter, this making the communication system according to the first aspect of the invention effective and more resistant to intrusion.

Furthermore, the electromagnetic pollution and congestion of bandwidth that are induced by the use of prior-art communication techniques, in particular because of their broadcast nature, are significantly decreased.

For example, the photonic components of a given plurality are arranged in a two-dimensional matrix array.

Where appropriate, the photonic components of the at least one plurality are configured conjointly with a forming optic of the photonic device.

According to one particularity, the plurality of photonic components comprises at least one first photonic component or one first group of photonic components configured to emit an optical wireless communication signal in a first emission cone and at least one second photonic component or one second group of photonic components configured to emit an optical wireless communication signal in a second emission cone; the first and second emission cones are distinct from each other.

According to another particularity, the plurality of photonic components comprises at least one first photonic component or one first group of photonic components configured to receive an optical wireless communication signal in a first reception cone and at least one second photonic component or one second group of photonic components configured to receive an optical wireless communication signal in a second reception cone; the first and second reception cones are distinct from each other.

Preferably, the first and second emission and/or reception cones are distinct from each other at least over an effective, for example maximum, communication distance of the communication system.

According to another particularity, the plurality of photonic components comprises at least one photonic component or one group of photonic components configured to emit successive optical wireless communication signals and the control electronics are furthermore configured to control at least one among an intensity and a duration of each signal, and a frequency of mutual succession of the optical communication signals.

The communication system according to the first aspect of the invention thus allows the emitted and/or received information to be coded.

According to another particularity, the frequency of mutual succession of the optical communication signals is parameterized so that it allows the transmission of a significant number of data in a small time interval. This may prove to be necessary when the vehicles communicating together are moving with respect to each other at a relatively significant speed or when the vehicle communicating with an infrastructure located for example on the road edge is moving at a significant speed.

According to another particularity, the plurality of optical components comprises at least one among a photonic component or a group of photonic components configured to emit an optical wireless communication signal the wavelength of which belongs to the spectrum visible to the human eye and at least one second photonic component or one second group of photonic components configured to emit an optical wireless communication signal outside of the spectrum visible to humans, for example in the infrared or the ultraviolet.

The communication system according to the first aspect of the invention thus allows communication signals belonging to various spectra to be used.

According to another particularity, the plurality of photonic components comprises at least one photonic component or one group of photonic components configured to emit an optical wireless communication signal the wavelength of which belongs to the spectrum visible to humans, said optical wireless communication signal being parameterized so as to participate, concomitantly or successively to its communication function, in at least one regulated photometric function chosen from a high-beam function, a low-beam function, a daytime-running-light function, a position-light function and a fog-light function.

The same photonic device thus allows both the function of communicating information to another vehicle or to an infrastructure and a regulated photometric function to be performed.

According to another particularity, the plurality of photonic components comprises at least one photonic component or one group of photonic components configured to successively emit and receive the at least one optical wireless communication signal.

A given photonic component may thus be configured to emit, then receive, or vice versa, a communication signal.

According to another particularity, the system furthermore comprises a camera that is functionally connected to the control electronics and configured to locate, or even identify, a target with which to communicate.

The camera is thus advantageously configured to acquire information on the environment of the communication system the operation of which may thus be automatically controlled depending on the required information, in particular by way of the control electronics.

According to another particularity, the system furthermore comprises additional communication means functionally connected to the control electronics and configured to implement at least one of the communication technologies among Wifi™ technology, Bluetooth® technology and omnidirectional optical wireless communication technology.

Thus a plurality of communication modes may be defined.

According to another particularity, the photonic components of a given plurality form a monolithic array.

The communication system according to the first aspect of the invention is thus advantageously compact and high-performance.

According to another aspect, the present invention also relates to a luminous device able to at least partially perform at least one regulated photometric function and comprising at least one communication system according to the first aspect of the invention. Preferably, the photonic device of the communication system participates at least partially in the performance of said at least one regulated photometric function.

The present invention also relates to a motor vehicle comprising a luminous device able to at least partially perform at least one regulated photometric function and comprising at least one communication system according to the first aspect of the invention.

Figure 2:
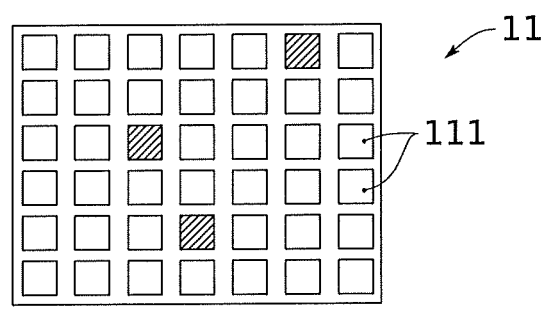
Figure 3:
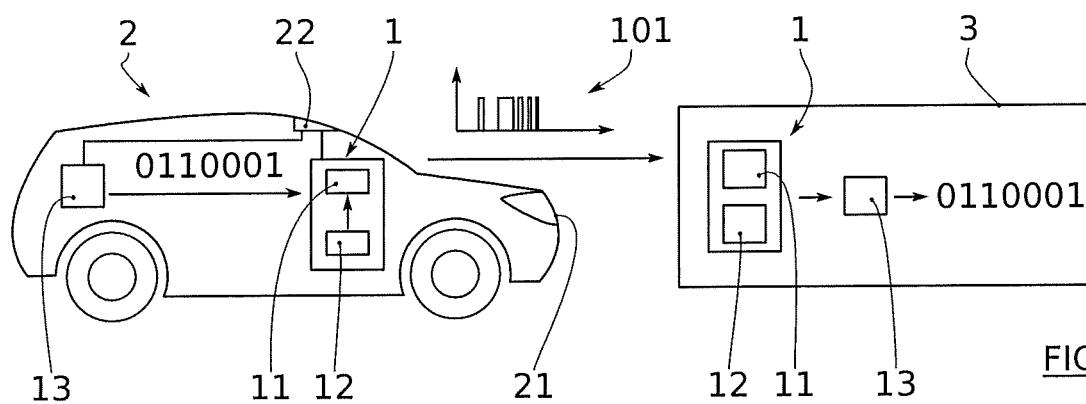
Figure 4:
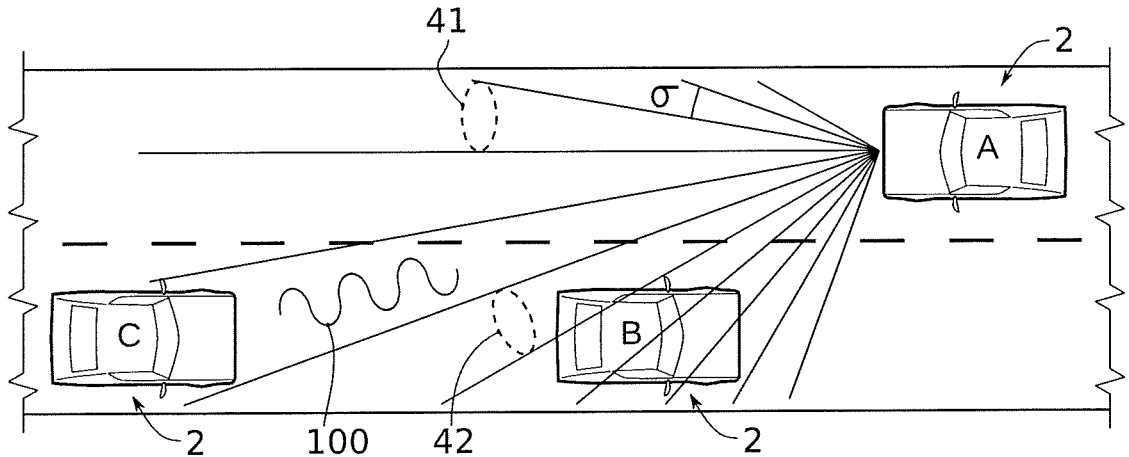
Figure 5:
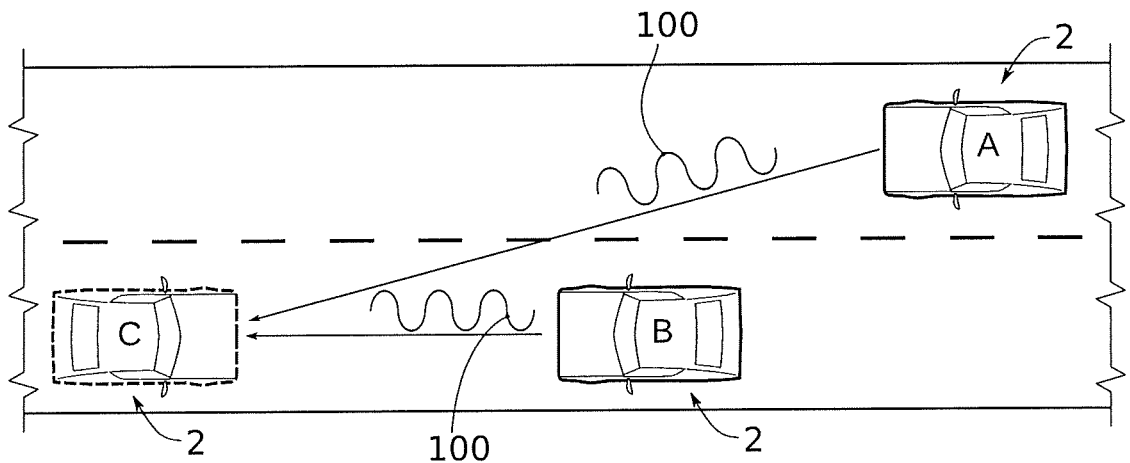
Figure 6:
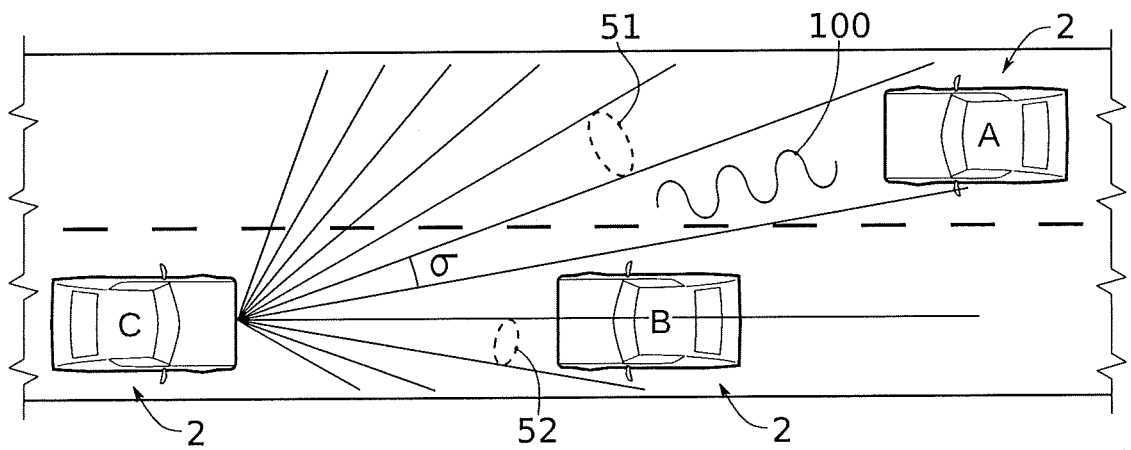

Other features and advantages of the present invention will be better understood from the following exemplary description and the drawings, in which:

FIG. 1 schematically illustrates the emission-side operation of optical wireless communication systems according to the prior art;

FIG. 2 shows a photonic device of an optical wireless communication system according to one embodiment of the invention;

FIG. 3 schematically illustrates a communication method implemented by an optical wireless communication system according to one embodiment of the invention;

FIG. 4 schematically illustrates the emission-side operation of an optical wireless communication system according to one embodiment of the invention;

FIG. 5 schematically illustrates the reception-side operation of optical wireless communication systems according to the prior art; and FIG. 6 schematically illustrates the reception-side operation of an optical wireless communication system according to one embodiment of the invention.

Unless specifically indicated otherwise, technical features described in detail for one given embodiment may be combined with the technical features described in the context of other embodiments described by way of example and nonlimitingly.

Likewise, unless specifically indicated otherwise, the terms "downstream" and "front" are understood to mean a relative arrangement of an element of the invention further downstream along the path of the radiation issued from the photonic device and exiting from the photonic device. The terms "upstream" or "rear" have the opposite meaning.

By "pixel" what is meant is the smallest element of an area for emitting and receiving light, whether visible or not, that it is possible to individually associate with at least one intensity, or even one colour, of the light.

By "optic" what is meant is the front portion of an optical wireless communication system comprising all of the refringent media that compose it.

By "forming optic" what is meant is an optic configured to deviate at least one of the rays emitted by a luminous or photonic device. By "deviate" what is meant is that the direction of entrance of the light ray into the forming optic is different from the direction of exit of the light ray from the forming optic. The forming optic comprises at least one optical element such as one or more lenses, one or more reflectors, one or more light guides or a combination of these possibilities.

By "a regulated photometric function" what is meant is a lighting function intended to allow, manage or increase the safety of the use of motor vehicles. It is for example chosen among a high-beam function, a low-beam function, a daytime-running-light function, a position-light function, a fog-light function, and a signalling-light function.

By "distinct" what is meant is the quality of two elements that are not coincident/merged/indistinguishable and that preferably do not overlap or intersect with each other, at least to a certain extent.

FIGS. 1, 4, 5 and 6 show a road scene relating to the use of a "right-hand drive" vehicle. The invention described below is of course applicable to the use of a "left-hand drive" vehicle.

In its broadest acceptance, the invention according to its first aspect relates to an optical wireless communication system 1 for a vehicle 2. With reference to FIGS. 2, 3, 4 and 6, the system comprises at least one photonic device 11 and at least one set of control electronics 12. The control electronics 12 are configured to control the photonic device 11. The photonic device 11 comprises a plurality of photonic components 111 and the control electronics 12 are configured to control the photonic components of the plurality of photonic components individually or in groups. Each photonic component or each group of photonic components is configured so as to emit and/or receive at least one optical wireless communication signal 100 in a propagation direction that is discriminable relatively to a propagation direction of optical wireless communication signals emitted and/or received, respectively, by at least one other photonic component or by at least one other group of photonic components of the plurality of photonic components.

Said at least one optical wireless communication signal 100 is capable of carrying a message comprising at least one of the following pieces of information:
- a position and/or a speed of the emitting vehicle, this allowing the risk of collision to be analysed;
- oral information to be passed between two vehicles, for example a personal message from one driver to another;
- information given by the police services and addressed to a recipient vehicle; and
- information relating to the environment of the emitting vehicle, for example to the state of traffic around the emitting vehicle or to climatic conditions.

According to one preferred embodiment of the first aspect of the invention, the photonic components 111 of a given plurality are arranged in a two-dimensional matrix array in the way illustrated in FIG. 2. For example, the photonic components 111 that, in FIG. 2, are illustrated by squares filled with oblique lines are photonic components that are emitting photons and the others are photonic components that are not emitting photons, or vice versa, depending on the almost-instantaneous control that the control electronics 12 exerts on the two-dimensional matrix array of photonic components 111. The photonic device 11 is thus able to project a pixelated beam. Each photonic component 111 is an elementary emitter that is selectively activatable in order to emit an elementary light beam.

Furthermore, the communication system 1 may comprise a forming optic configured, conjointly with the photonic components 111 of at least one plurality of photonic components, to each project said elementary light beams in the form of a pixel. Together the pixels form said pixelated beam.

Advantageously, the control electronics 12 are able to selectively control the light intensity of each of the pixels of the pixelated beam, and in particular to selectively activate or deactivate each of the pixels of said pixelated beam, depending on control instructions received from a processing unit 13, such as illustrated in FIG. 3.

The forming optic may be arranged so that the pixelated beam has a vertical amplitude of at least 5° and a horizontal amplitude of at least 5°. These horizontal and vertical amplitudes make it possible to ensure that the pixelated beam is projected onto a zone of the road that is sufficiently vast to perform functions whereby a pattern in this pixelated beam is written by projection on the road, and in particular functions whereby marks are displayed on the ground, the driver is assisted and GPS information projected, or even adaptive lighting functions that require the lighting beam to be pixelated and in particular regulated photometric functions such as those that produce a non-dazzling high beam or a dynamic lighting beam that moves during cornering. The forming optic may thus comprise one of the following optical components or a combination of a plurality of the following optical components: lens, reflector, guide, collimator, prism.

Where appropriate, the photonic device 11 may comprise at least 20 columns and at least 20 rows of elementary emitters, in particular at least 32 rows and columns of elementary emitters.

These minimum numbers of columns and of rows of elementary emitters, in combination with the aforementioned horizontal and vertical amplitudes, make it possible to obtain, for each of the elementary light beams, optionally once projected via the forming optic, an angular aperture, or solid angle σ, smaller than 0.5°, or even the smaller than 0.3°. Thus, the pixelated beam when projected onto the road has a minimum resolution such that said pattern projected by the pixelated beam may be satisfactorily perceived by a road user and/or by the driver of the vehicle thus equipped.

The photonic components 111 and optionally the forming optic may be arranged so that two neighbouring pixels, i.e. two pixels adjacent in a given row or in a given column of the two-dimensional matrix array, are contiguous, i.e. their adjacent edges are coincident.

According to a first particular embodiment of the photonic device 11, each photonic component may more particularly comprise at least one light-emitting diode that emits light. The associated forming optic may more particularly comprise a digital micromirror device (DMD) that directs the light rays issued from the photonic components by reflection, for example toward another element of the forming optic. Where appropriate, another element of the forming optic allows the light rays issued from the photonic components to be collected in order to concentrate them and direct them toward the surface of the digital micromirror device. Each micromirror may pivot between two set positions, so that, each micromirror reflecting one portion of the light rays, the actuation and control of the change in position allows the shape of the beam emitted via the forming optic and in fine onto the road to be modified.

According to a second particular embodiment of the photonic device 11, each photonic component comprises a laser source that emits a laser beam and the forming optic comprises a laser-scanning system configured to scan, with each emitted laser beam, the surface of a wavelength-converting element. The scan of the beam is accomplished via the scanning system at a sufficiently high speed that the human eye is unable to perceive its movement in the projected beam. Synchronously controlling the turn on of the laser source and the scanning movement of the beam allows a pixelated light beam to be controlled. Here, the scanning system more particularly comprises a plurality of movable micro-mirrors, allowing the surface of the wavelength-converting element to be scanned by reflection of the laser beam. The micro-mirrors are for example microelectromechanical systems (MEMS). However, the invention is in no way limited to this scanning means, and other sorts of scanning devices, such as a series of mirrors arranged on a rotating element, the rotation of the element causing the laser beam to scan the transmission surface, may be used.

According to a third embodiment of the photonic device 11, the latter comprises a solid-state light source. The solid-state light source comprises, by way of photonic components 111, a plurality of what are called electroluminescent elementary elements that are arranged in a matrix array in at least two columns and two rows. Examples of such electroluminescent elements include light-emitting diodes (or LEDs), organic light-emitting diodes (or OLEDs), or polymer light-emitting diodes (or PLEDs), or indeed micro-LEDs.

Preferably, the solid-state light source comprises at least one monolithic array of electroluminescent elements, i.e. what is also simply called a monolithic array. In a monolithic array, the electroluminescent elements are grown from a common substrate and are electrically connected so as to be selectively activatable, individually or in sub-sets of electroluminescent elements. The substrate may mainly be made of semiconductor. The substrate may comprise one or more other materials, for example non-semiconductors. Thus, each electroluminescent element or group of electroluminescent elements may form a luminous pixel and may emit light when it is supplied with electricity. However, each electroluminescent element or group of electroluminescent elements may collect light radiation, where appropriate having a substantially set wavelength and one particular direction, in order to convert the photons of said light radiation into an electrical current.

A monolithic array may take the form of a two-dimensional matrix array of electroluminescent elements. Such a monolithic array allows selectively activatable pixels to be arranged very close to one another, with respect to conventional light-emitting diodes intended to be soldered to printed circuit boards. Furthermore, the luminance obtained with the plurality of electroluminescent elements is a least 60 $Cd/mm^2$, and preferably at least 80 $Cd/mm^2$.

In the context of the invention, the monolithic array comprises electroluminescent elements a main dimension of elongation of which, namely the height of which, is substantially perpendicular to a common substrate, this height being at most equal to one micron.

As mentioned above, the photonic device 11 may be coupled to control electronics 12 for controlling its light emission. The control electronics 12 may thus control (it is also possible to say "drive") the generation and/or projection of a pixelated light beam by the photonic device 11. The control electronics 12 may be integrated into the photonic device 11. The control electronics 12 may be configured to control one or more monolithic arrays.

The control electronics 12 may comprise or be arranged conjointly with a central processing unit 13. The latter is generally coupled to a memory in which is stored a computer program that comprises instructions allowing the processor to carry out steps of generating the signals allowing the photonic device 11 to be controlled. The control electronics 12 may thus for example individually control the light emission of each pixel of a monolithic two-dimensional matrix array.

The control electronics 12 may form an electronic device able to control the electroluminescent elements 111. The control electronics may be an integrated circuit. Integrated circuits, also called electronic chips, are electronic components that perform one or more electronic functions and that may incorporate several types of basic electronic components, for example in a small volume (i.e. on a small wafer). This makes the circuit easy to implement and to integrate for example into a headlamp 21 of a motor vehicle 2 such as shown in FIG. 3.

The integrated circuit may for example be an ASIC or an ASSP. An ASIC (acronym of application-specific integrated circuit) is an integrated circuit developed for at least one specific application (i.e. for one customer). An ASIC is therefore a specialized (micro-electronic) integrated circuit. In general, it groups together a high number of single or made-to-measure functionalities. An ASSP (acronym of application-specific standard product) is a (micro-electronic) integrated electronic circuit grouping together a high number of functionalities meeting the needs of a generally standardized application. An ASIC is designed for a more particular (specific) need than an ASSP. The monolithic arrays are supplied with electricity via the control electronics 12, which themselves are supplied with electricity for example using at least one connector connecting it to an electricity source. The electricity source may be internal or external to the communication system 1 according to the invention. The control electronics 12 supplies the photonic device 11 with electricity.

According to one preferred embodiment of the photonic device 11, it comprises at least one monolithic two-dimensional matrix array the electroluminescent elements 111 of which protrude from a common substrate from which they were respectively grown. Various arrangements of electroluminescent elements 111 may meet this definition of a monolithic array, provided that the electroluminescent elements have one of their main dimensions of elongation substantially perpendicular to a common substrate, and that the spacing between the pixels, formed by one or more electroluminescent elements electrically grouped together, is small in comparison to the spacings imposed by known arrangements of flat square chips soldered to a printed circuit board.

In particular, the photonic device 11 according to its preferred embodiment may comprise, such as will be described in more detail below, a plurality of electroluminescent elements 111 that are distinct from one another, that are grown individually from the substrate and that are electrically connected in order to be selectively activatable, where appropriate in groups or in subgroups. Within each electroluminescent element 111, rods may be activated simultaneously. More particularly, the electroluminescent elements are of submillimetre dimensions and protrude from a substrate so as to form rods of hexagonal cross section. The electroluminescent rods extend parallel to the optical axis of the photonic device 11.

The electroluminescent rods are grouped together, in particular via electrical connections specific to each array, into a plurality of selectively activatable segments. The electroluminescent rods start on a first face of a substrate. Each electroluminescent rod, for example formed using gallium nitride (GaN), protrudes perpendicularly, or substantially perpendicularly, from the substrate, which is for example based on silicon. Other materials such as silicon carbide may be used without departing from the context of the invention. By way of example, the electroluminescent rods could be made from an alloy of aluminium-gallium nitride (AlGaN), or from an alloy of aluminium, indium and gallium phosphide (AlInGaP). Each electroluminescent rod extends along an axis of elongation defining its height, the base of each rod being placed in a plane of the upper face of the substrate.

The electroluminescent rods of a given monolithic array advantageously have the same shape and the same dimensions. They are each bounded by an end face and by a circumferential wall that that extends along the axis of elongation of the rod. When the electroluminescent rods are doped and biased, the resulting light output from the rods is emitted essentially from the circumferential wall, though it will be understood that the light rays may also exit from the end face. As a result, each rod acts as a single light-emitting diode and the luminance of this source is improved, on the one hand by the density of the present electroluminescent rods, and on the other hand by the size of the lighting area defined by the circumferential wall, which therefore extends over all the perimeter and over all the height of the rod. The height of a rod may be comprised between 2 and 10 µm, and is preferably substantially equal to 8 µm; the largest dimension of the end face of a rod is smaller than 2 µm, and preferably smaller than or equal to 1 µm.

It will be understood that during the formation of the electroluminescent rods, the height may be modified from one zone of the photonic device 11 to the next, so as to increase the luminance of the corresponding zone when the average height of its constituent rods is increased. Thus, a group of electroluminescent rods may have a height, or heights, that are different from another group of electroluminescent rods, these two groups being constituents of the same monolithic array. The shape of the electroluminescent rods may also vary from one monolithic array to another, in particular as regards the cross section of the rods and as regards the shape of the end face. The rods have a cylindrical general shape, and they may in particular have a cross section of polygonal, and more particularly hexagonal, shape. It will be understood that what is important is for the light to be able to emitted through the circumferential wall, independently of whether it has a polygonal or circular shape.

Moreover, the end face may have a shape that is substantially planar and perpendicular to the circumferential wall, so that it extends substantially parallel to the upper face of the substrate, or indeed it may have a curved shape or have a tip at its centre, so as to multiply the directions of emission of the light exiting from this end face.

The electroluminescent rods are preferably arranged in a two-dimensional matrix array. This arrangement could be such that the rods are arranged staggered. Generally, the rods are placed at regular intervals over the substrate and the distance separating two immediately adjacent electroluminescent rods, in each of the dimensions of the matrix array, must be at least equal to 2 µm, and preferably comprised between 3 µm and 10 µm, in order for the light emitted by the circumferential wall of each rod to be able to exit from the matrix array of electroluminescent rods. Moreover, provision will be made for these separating distances, measured between two axes of elongation of adjacent rods, to not be larger than 100 µm.

According to one variant of the preferred embodiment of the photonic device 11, the monolithic array may comprise electroluminescent elements formed by epitaxially growing electroluminescent-element layers, in particular a first layer made of n-doped GaN and a second layer made of p-doped GaN, on a single substrate, for example made of silicon carbide, and that is diced (by milling and/or ablation) in order to form a plurality of electroluminescent elements respectively obtained from the same substrate. With such a design, a plurality of electroluminescent chips are obtained from the same substrate, which chips are electrically connected in order to be activatable selectively from one another.

In one example embodiment according to this variant, the substrate of the monolithic matrix array may have a thickness comprised between 100 µm and 800 µm, and in particular equal to 200 µm; each chip may have a width comprised between 50 µm and 500 µm, and preferably comprised between 100 µm and 200 µm. Their length and width may be equal to each other. The height of each chip is smaller than 500 µm, and preferably smaller than 300 µm. The exit surface of each chip may be formed by the substrate on the side opposite to the epitaxial growth. The distance separating two adjacent electroluminescent chips may be smaller than 1 µm, in particular smaller than 500 µm, and it is preferably smaller than 200 µm.

Each monolithic array of electroluminescent chips may more particularly have a least one of the following features:
the number of electroluminescent chips may be comprised between 250 and several thousand, a typical value being about one-thousand chips;
the overall shape is usually square, and may also be rectangular. More particularly, their aspect ratio is generally comprised between 1:1 and 1:5; and
the characteristic size of a unitary pixel is comprised between 100 and 300 µm in the current state of the art.

According to another embodiment of the photonic device 11, which is applicable both to electroluminescent rods that respectively protrude from the same substrate, such as described above, and to electroluminescent chips obtained by dicing electroluminescent layers superposed on the same substrate, the monolithic matrix array may furthermore comprise a layer of a polymer material in which the electroluminescent elements are at least partially embedded. The layer may thus extend over the entire extent of the substrate or only over a defined group of electroluminescent elements. The polymer material, which may in particular be based on silicone, creates a protective layer that allows the electroluminescent elements to be protected without hindering the diffusion of the light rays. Furthermore, it is possible to integrate, into this layer of polymer material, wavelength-converting means, and for example luminophores, able to absorb at least some of the rays emitted by one of the elements and to convert at least some of said absorbed excitation light into a light emission having a wavelength different from that of the excitation light. Provision will possibly be made either for the luminophores to be embedded into the bulk of the polymer material, or indeed for them to be placed on the surface of the layer of this polymer material.

The light source may furthermore comprise a coating of reflective material in order to deviate the light rays toward the output surfaces of the photonic device 11.

The electroluminescent elements of submillimetre dimensions define, in a plane substantially parallel to the substrate, a defined output area. It will be understood that the shape of this exit area is defined by the number and arrangement of the electroluminescent elements from which it is formed. It is thus possible to define an emission area of substantially rectangular shape, though it will be understood that this shape may be varied and that any shape may be used without departing from the context of the invention.

FIG. 3 schematically illustrates a communication method implemented by an optical wireless communication system according to one embodiment of the invention. Nonlimitingly, the communication system 1 such as illustrated in FIG. 3 comprises, apart from the components thereof that were introduced above, a camera 22 (or another sensor, for example a laser) that is functionally connected to the control electronics 12, where appropriate via the processing unit 13, and configured at least to locate, or even identify, a target with which to communicate.

The camera 22 is advantageously configured to acquire information on the environment of the communication system 1, the operation of which may thus be automatically controlled depending on the acquired information. Such automatic control necessarily requires the control electronics 12 to be used, and possibly the processing unit 13 to be used.

Again with reference to FIG. 3, the optical communication signals 101 may follow one after the last at a set frequency or equivalently at controlled time intervals, so as to take the form of a train of light pulses, which is optionally pulse-width modulated. The signals may take other forms, and for example that of an amplitude- or frequency-modulated light signal.

In the illustrated example, the intensity of the light pulses is constant, whereas their duration and/or the time interval separating two consecutive pulses varies. The inverse is also envisionable. Likewise, it is envisionable for each of the three parameters that are the intensity, the duration and the time interval between two consecutive pulses to vary.

The pulse train 101 shown in FIG. 3 represents the situation in which the first photonic components or a first group of photonic components are supplied in succession with the same electrical current over durations that are different from one another and in which the time interval between two pulses is irregular.

Whatever the one or more variations defining the pulse train, it will be understood that such a pulse train is able to code data digitally. It will also be understood that these data may be coded via the control electronics 12 on the basis of digital data generated for example by the processing unit 13.

Again in the example illustrated in FIG. 3, the train 101 of light pulses is emitted to an infrastructure 3 that also comprises a communication system 1 according to the invention. More particularly, the infrastructure 3 comprises a photonic device 11 certain at least of the photonic components of which are able to receive the train 101 of light pulses and the control electronics 12 of which are able to determine, or rather transcribe for a processing unit 13, the characteristics in terms of at least one of the three aforementioned parameters, so that the processing unit 13 may interpret these characteristics in order to ascertain the data coded in the form of said pulse train 101.

FIG. 1 illustrates a situation encountered during the use of current communication systems. In this situation, the motor vehicle 2 referenced with an A (vehicle A below) omnidirectionally emits communication signals that are intended for the motor vehicle 2 referenced with a C (vehicle C below). The signals are therefore emitted in every direction and therefore also in the direction of the motor vehicle 2 referenced with a B (vehicle B below), for which the signals are not intended. Thus, it may be seen that the communication signs are not specifically sent to one particular road user, here vehicle C, or to one particular road infrastructure 3. The communication signals could be read by inappropriate communication systems, or at least communication systems that are not intended to be recipients, this leading to communication ineffectiveness and a risk of intrusion. Furthermore, the emission of communications signals in every direction leads to electromagnetic pollution and to bandwidth congestion.

The communication system according to the invention, such as described above, allows this situation to be solved in the way illustrated in FIG. 4.

The plurality of photonic components 111 of the photonic device 11 of vehicle A may comprise at least one first photonic component or one first group of photonic components configured to emit a communication signal in a first emission cone 41, of solid angle σ, oriented toward vehicle C, and not toward vehicle B. At least one second photonic component or group of photonic components may be configured to emit a communication signal in a second emission cone 42, such as illustrated in FIG. 4, the second emission cone 42 being distinct from the first emission cone 41, and the second photonic components being different from the first photonic components. For example, it is possible to use the first photonic components to communicate specifically with vehicle C and to use, at the same time or successively, the second photonic components to communicate specifically with vehicle B.

In this particular configuration in which the vehicles are assumed to be moving with respect to one each other, in particular at speeds able to reach 130 km/h, it is important for the communication signals to be emitted relatively rapidly. This is why it is advantageous for, with the photonic devices described above, it to be possible to achieve, emission-side, a frequency of mutual succession of the communication signals such that the emission of a significant number of data in a short time interval is possible. This may also prove to be necessary when the vehicle communicating with an infrastructure, located for example on the road edge, is moving at a significant speed.

Specifically, it is preferable for the communication to be ensured end-to-end by the same photonic components. This will be the case if all of the data of the communication can actually be transmitted to the recipient in a short time via a single emission cone.

If the transmission frequency of the data is insufficient or equivalently if the relative speed of the vehicles communicating together is too high for the communication to be ensured end-to-end by the same photonic components, it is envisionable to use other photonic components, corresponding to another emission cone, to continue the communication. These other photonic components will possibly as required be determined depending on data collected on the environment of the communicating vehicles, for example data collected via the camera 22 with which the emitting vehicle is equipped.

By virtue of the system according to the first aspect of the invention, the communication signals may be specifically directed toward one or more targets, in order to be received, or even read, solely by this/these targets. Thus, the transmission of communications signals to targets other than the target(s) to which the signals are addressed is avoided. It is therefore possible to prevent the communication signals from being read by systems for which they are not intended, this making the communication system according to the first aspect of the invention effective and more resistance to intrusion. Furthermore, the electromagnetic pollution and bandwidth congestion induced by the use of the prior-art communication techniques, in particular because of their broadcast nature, are significantly decreased.

FIG. 5 illustrates a situation encountered during the use of current communication systems. In this situation, vehicle A omnidirectionally emits communication signals that are intended for vehicle C, and vehicle B also omnidirectionally emits communication signals intended for vehicle C. The signals are assumed to be at least partially emitted at the same time. Therefore, it may be seen that, to vehicle C, the communication signals received from vehicle A are not discriminable, as such, from the communication signals received from vehicle B. Vehicle C may be incapable of determining, on the basis of the received light flux alone, which of the emitting vehicle among vehicles A and B sent one of the two received messages, and which of the emitting vehicle among vehicles A and B sent the other of the two received messages. Furthermore, the emission of communications signals in every direction leads to electromagnetic pollution and to bandwidth congestion.

The communication system according to the invention, such as described above, allows this situation to be solved in the way illustrated in FIG. 6.

The plurality of photonic components 111 of the photonic device 11 of vehicle C may comprise at least one first photonic component or one first group of photonic components configured to receive a communication signal in a first reception cone, of solid angle σ, oriented toward vehicle A, and not toward vehicle B. Furthermore, the plurality of photonic components 111 of the photonic device 11 of vehicle C may furthermore comprise at least one second photonic component or one second group of photonic components configured to receive a communication signal in a second reception cone, of solid angle ρ, oriented toward vehicle B, and not toward vehicle A. Such as illustrated in FIG. 6, the second reception cone 52 is distinct from the first reception cone 51, and the second photonic components being different from the first photonic components.

Since the vehicles are once again liable to be moving with respect to each other, in particular at speeds able to reach 130 km/h, it is important for the communication signals to be received relatively rapidly. This is why it is advantageous for, with the photonic devices described above, it to be possible to achieve, reception-side, a frequency of mutual succession of the signals such that the reception of a significant number of data in a short time interval is possible. This may also prove to be necessary when the vehicle communicating with an infrastructure, located for example on the road edge, is moving at a significant speed.

Specifically, it is preferable for the communication to be ensured end-to-end by the same photonic components. This will be the case if all of the data of the communication can actually be received by the recipient in a short time during which said photonic components receive the corresponding signals from the emitting vehicle via a single emission cone.

If the reception frequency of the data is insufficient or equivalently if the relative speed of the vehicles communicating together is too high for the communication to be ensured end-to-end by the same photonic components, it is envisionable to use other photonic components, corresponding to another emission cone, to continue the communication. These other photonic components will possibly as required be determined depending on data collected on the environment of the communicating vehicles, for example data collected via the camera 22 with which the emitting vehicle is equipped.

By virtue of the system according to the first aspect of the invention, communication signals may be received from one or more identified emitters, and from which emitter such a message originates from. Thus, the communication system allows, via the discriminability of (or ability to discriminate) the received signals, vehicles or infrastructure receiving communication signals to be able to determine the emitter thereof unequivocally. It is thus possible to prevent communications signals from being able to be received from an indeterminate emitter, this making the communication system according to the first aspect of the invention effective and more resistant to intrusion. Furthermore, the electromagnetic pollution and bandwidth congestion induced by the use of prior-art communication techniques, in particular because of their broadcast nature, are significantly decreased.

Thus, the invention exploits the fact that the propagation direction of the communication signals forms part of a set of emission and/or reception characteristics of each photonic component or of a defined group of photonic components.

The emission cones 41, 42 illustrated in FIG. 4 and the reception cones 51, 52 illustrated in FIG. 6 are strictly distinct pairwise. In other words, even if they were extended to infinity, they would not interact. However, the invention is not limited to this type of distinction between cones. The cones may for example intersect at a certain distance, and in particular at infinity, providing that this distance is larger than that over which messages carried by the communication signals 100 may be communicated. More particularly, since optical wireless communication signals 100 have a limited range in terms of effective communication distance, what is important is for the emission and/or reception cones to be distinct from one another at least over an effective communication distance of the communication system.

Specifically, the constraint in terms of emission and/or reception directivity of each photonic component or each group of photonic components of the photonic device is quantifiable in terms of solid angle of an emission and/or reception cone, respectively. The value of this solid angle σ essentially depends on the characteristics of the photonic components and where appropriate on the optical arrangement, such as the aforementioned forming optic, with which these components are arranged. In other words, the value of the solid angle of the emission and/or reception cone of each photonic component or group of photonic components is essentially related to physical properties that are set or at least do not vary greatly. It may also be related to operating parameters of the photonic components such as the electrical current with which the components are supplied or on any mobility of the optical arrangement relative to the photonic components. Furthermore, in so far as the emission and/or reception cones have defined solid angles, the constraint in terms of emission and/or reception directivity of each photonic component or each group of photonic components of the photonic device may be translated into terms of non-intersection of its emission and/or reception cone with the emission and/or reception cone of another photonic component or of another group of photonic components. This notion of non-intersection of the emission and/or reception cones may depend on the distance between the sites of emission and of reception of the communication signals.

Thus, it is sufficient for these cones not to intersect, or to intersect imperceptibly, beyond a defined, preferably maximum, effective communication distance of the communication system. In this sense, the emission and/or reception wavelength, the supplied electrical current and the range of the light emission of the photonic components are as many parameters that allow said effective communication distance to be adjusted, and that, consequently, allow, optionally at the price of routine trials, a compromise to be found between the constraints of effectiveness of the communication and of emission and/or reception directivity.

The plurality of photonic components 111 may comprise a first photonic component or a first group of photonic components configured to emit an optical wireless communication signal 100 the wavelength of which belongs to the spectrum visible to humans, with or without wavelength-converting means. In this case, the optical wireless communication signal may be parameterized so as to participate, concomitantly or successively, not only in its communication function, but also in a regulated photometric function. Thus, the communication system 1 according to this feature has the advantage of avoiding an additional source and an additional module in addition to the luminous device 21 allowing said regulated photometric function to be performed.

Alternatively or in addition, the plurality of photonic components 111 may comprise a second photonic component or a second group of photonic components configured to emit an optical wireless communication signal outside of the spectrum visible to humans, for example in the infrared or ultraviolet.

Furthermore, the photonic device 11 with which the emitting vehicle is equipped and the photonic device 11 with which the receiving vehicle is equipped may advantageously be identical to each other. The photonic devices 11 such as described above may effectively serve to emit and receive optical wireless communication signals 100. However, the photonic components used reception-side cannot be used concomitantly emission-side, and vice versa. Nevertheless, it is advantageously possible for certain photonic components of a photonic device 11 to be used reception-side, whereas other photonic components of the photonic device 11 are concomitantly used emission-side.

The invention also relates, according to another aspect, to a luminous device 21, such as illustrated in FIG. 3, able to at least partially perform at least one regulated photometric function and comprising at least one communication system 1 such as described above. The luminous device 21 is not limited to a headlamp located at the front of a motor vehicle, but may also be a stoplight located at the rear of the vehicle or an indicator light for example. Such luminous devices may furthermore perform optimized lighting functions such as an ADB function (ADB being the acronym of adaptive driving beam), a DBL function (DBL being the acronym of dynamic bending light), or a function of the type that produces a non-dazzling high beam.

The invention is not limited to the described embodiment but encompasses any embodiment covered by the appended claims.

In particular, the communication system may furthermore comprise additional communication means that are functionally connected to the control electronics and that are configured to implement at least one of the communication technologies among the Wifi™ technology, the Bluetooth® technology and the omnidirectional optical wireless communication technology.

It is thus possible to define a plurality of communication modes, and in particular a first communication mode implementing the photonic device 11 and a least one communication mode implementing prior-art communication technologies. These communication modes may be implemented successively. For example, the first communication mode may be used to communicate, to a target, a datum allowing encrypted data intended to be subsequently emitted via the prior-art communication technologies, following passage from the first communication mode to at least one second communication mode, to be decrypted.

It will be noted that, contrary to VLC (acronym of visible light communication) communication systems, the communication system 1 according to the present invention permits effective communication, in particular with photonic components emitting light that is visible to humans, even in the middle of the day, because of the directivity of the communication signals that it exploits. Specifically, since the photonic components capture only light signals that are inscribed in a defined reception cone, they are not, or less, susceptible to optical noise.

The invention claimed is:

1. An optical wireless communication system for a vehicle comprising at least one photonic device and control electronics configured to control the at least one photonic device, wherein the at least one photonic device comprises a plurality of photonic components and the control electronics are configured to control individually or in groups the photonic components of the plurality of photonic components, each photonic component or each group of photonic components being configured to emit and/or receive at least one optical wireless communication signal in a propagation direction that is discriminable relative to a propagation direction of optical wireless communication signals emitted and/or received, respectively, by at least one other photonic component or by at least one other group of photonic components of the plurality of photonic components, wherein the plurality of photonic components comprises at least one photonic component or one group of photonic components configured to emit successive optical wireless communication signals, each signal comprising a light pulse, and the control electronics are furthermore configured to control an intensity and a duration of a light pulse, and the time interval separating two consecutive light pulses, and wherein the time interval separating two consecutive light pulses is selected so that it allows the transmission of all data from the emitting vehicle in a predetermined time interval via a single emission cone from the emitting vehicle.

2. The system according to claim 1, wherein the photonic components of a given plurality are arranged in a two-dimensional matrix array.

3. The system according to claim 1, wherein the photonic components of a given plurality form a monolithic array.

4. The system according to claim 1, wherein the photonic components of the at least one photonic device are configured conjointly with a forming optic of the at least one photonic device.

5. The system according to claim 1, wherein the plurality of photonic components comprises at least one first photonic component or one first group of photonic components configured to emit an optical wireless communication signal in a first emission cone and at least one second photonic component or one second group of photonic components configured to emit an optical wireless communication signal in a second emission cone, the first and second emission cones being distinct from each other.

6. The system according to claim 1, wherein the plurality of photonic components comprises at least one first photonic component or one first group of photonic components configured to receive an optical wireless communication signal in a first reception cone and at least one second photonic component or one second group of photonic components configured to receive an optical wireless communication signal in a second reception cone, the first and second reception cones being distinct from each other.

7. The system according to claim 1, wherein the plurality of photonic components comprises at least one among a photonic component or a group of photonic components configured to emit an optical wireless communication signal the wavelength of which belongs to a spectrum visible to the human eye and at least one second photonic component or one second group of photonic components configured to emit an optical wireless communication signal outside of the spectrum visible to humans, including the infrared or the ultraviolet.

8. The system according to claim 1, wherein the plurality of photonic components comprises at least one among a photonic component or a group of photonic components configured to receive an optical wireless communication signal the wavelength of which belongs to a spectrum visible to the human eye and at least one second photonic component or one second group of photonic components configured to receive an optical wireless communication signal outside of the spectrum visible to humans, including the infrared or the ultraviolet.

9. The system according to claim 1, wherein the plurality of photonic components comprises at least one photonic component or one group of photonic components configured to emit an optical wireless communication signal the wavelength of which belongs to a spectrum visible to humans, the optical wireless communication signal being parameterized so as to participate, concomitantly or successively to its communication function, in at least one regulated photometric function chosen from a high-beam function, a low-beam function, a daytime-running-light function, a position-light function and a fog-light function.

10. The system according to claim 1, wherein the plurality of photonic components comprises at least one photonic component or one group of photonic components configured to successively emit and receive the at least one optical wireless communication signal.

11. The system according to claim 1, furthermore comprising a camera that is functionally connected to the control electronics and configured to locate, or identify, a target with which to communicate.

12. The system according to claim 1, furthermore comprising additional communication circuitry functionally connected to the control electronics and configured to implement at least one of the communication technologies among Wifi™ technology, Bluetooth® technology and omnidirectional optical wireless communication technology.

13. A luminous device at least partially performing at least one regulated photometric function and comprising at least one communication system according to claim 1.

14. A motor vehicle comprising a luminous device which at least partially performs at least one regulated photometric function and comprises at least one communication system according to claim 1.

15. The system according to claim 2, wherein the photonic components of a given plurality of photonic components form a monolithic array.

16. The system according to claim 2, wherein the photonic components of the at least one photonic device are configured conjointly with a forming optic of the photonic device.

17. The system according to claim 1, wherein the plurality of photonic components comprising at least one first photonic component or one first group of photonic components are configured to emit an optical wireless communication signal in a first emission cone and at least one second photonic component or one second group of photonic components are configured to emit an optical wireless communication signal in a second emission cone, the first and second emission cones being distinct from each other.

18. The system according to claim 1, wherein the plurality of photonic components comprising at least one first photonic component or one first group of photonic components are configured to receive an optical wireless communication signal in a first reception cone and at least one second photonic component or one second group of photonic components are configured to receive an optical wireless communication signal in a second reception cone, the first and second reception cones being distinct from each other.

* * * * *